Figure 1:
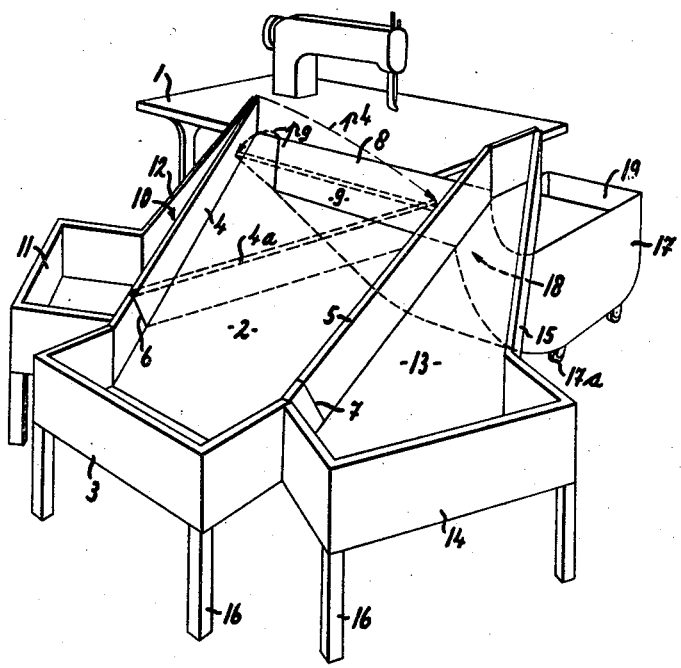

Oct. 22, 1963 A. ABEN 3,107,768
INSTALLATION FOR SORTING WORKPIECES ACCORDING
TO OPERATIONS TO BE PREFORMED THEREON
Filed June 6, 1960 2 Sheets-Sheet 1

INVENTOR.
ARTHUR ABEN
BY
ATTORNEY

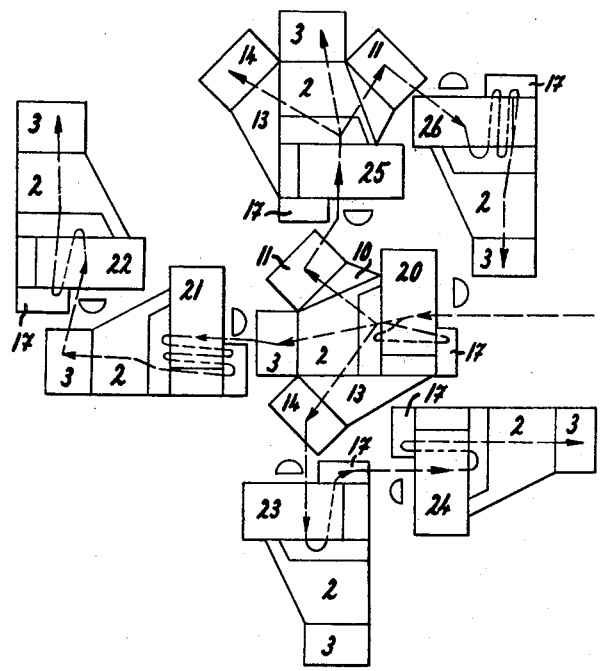

United States Patent Office 3,107,768
Patented Oct. 22, 1963

3,107,768
INSTALLATION FOR SORTING WORKPIECES ACCORDING TO OPERATIONS TO BE PERFORMED THEREON
Arthur Aben, Norrkoping, Sweden, assignor to Jan Eveleens, Oldenzaal, Netherlands
Filed June 6, 1960, Ser. No. 34,131
3 Claims. (Cl. 193—39)

In those industries where many and different operations are performed on the workpieces, where the time taken by the machines for the different operations is very short, where the speed of performing the operations is largely dependent upon the skill and character of the operative, and the characteristics of the workpieces are such that they require differing times for similar operations and do not permit completely mechanised handling and transport between the various operations, the introduction of automisation has encountered great difficulties. This is especially the case within the clothing and shoe industries, where material as soft and difficult to handle as fabrics and leather cannot be subjected to completely mechanical movement and handling between the numerous operations.

It is known in the shoe and clothing industries to provide different kinds of sewing machines and the like with delivery tracks along with the workpieces, after an operation has been performed on them, slide to a collecting place where the unsorted workpieces, which are often connected together in series by threads, must be picked up, sorted, stacked and bundled together so that they can easily be carried to the next machine and there be in the correct order for the next operation.

Where such a series of workpieces is to be subjected to several operations on the same machine, for example to have several seams made in it, an extra operative or the actual operative of the machine must, on completion of the first operation, collect the series of workpieces in the box and arrange it in the same order for the second operation as it was in for the first operation. The sequence in which the workpieces are worked on is of great importance, since they must run parallel with other series of workpieces which subsequently shall be assembled to form an article so that any changes in shade in the fabric or other irregularities in the material will not appear in different parts of the same article but only in different articles.

The previous work arrangement has, furthermore, not permitted a smooth adjustment of the manufacture to different operatives' speed of working and to interruptions (seeking of faults, adjustment of machines and other disturbances to a steady work speed), because operatives, when working in a row, have not been able to have such a view of how the work is progressing that they can adjust their work to that of the others, for example periodically performing an extra operation on the workpieces. Previously the old rule has applied that the speed of the whole series of operations was determined by the slowest operation.

The object of the invention is to render possible any suitable grouping of different machines in such a way that the workpieces after they have been worked on in one or more machines can be brought, at will, by at least two different paths, to one or several different machines or back to the same machine for a further operation without intervening sorting, bundling and transport.

The invention is mainly characterized by at least two guide paths fitted with a guide device and connected to the delivery side of the machine; by means of the guide device workpieces, which have been worked on in the machine, are led, at will, to one of two or more collecting boxes connected to each guide path, and the collecting boxes are locatable within a convenient distance from one or more operatives who perform the succeeding operations.

This renders it possible for much larger series with a larger number of workpieces, connected for example by thread, to be worked on. Only the first workpiece in each series need be marked, for example by a number or work label sewn or stuck on to it. The operative sitting by the delivery box can, without difficulty, pick up the first workpiece so marked and perform the required operation on the series even before the previous operative has finished the previous operation.

An embodiment of the invention is shown diagrammatically in the accompanying drawings in which FIGURE 1 is a perspective view of an apparatus fitted to a sewing machine and FIGURE 2 is a plan view of a group of machines for performing a succession of operations.

As shown in FIGURE 1, the delivery edge of the table 1 of a sewing machine is connected to a chute 2 which leads to a compartment 3. The sides of the chute are fitted with side walls 4 and 5 which are pivotally mounted at their lower ends by lengths 6 and 7 respectively, the pivotal axes being substantially perpendicular to the sliding surface of the chute 2. In this way either of the side walls can be swung inwardly until its upper end is adjacent the opposite side wall. In FIGURE 1 there is shown, in chain lines, the side wall 4 swung, in the direction shown by the arrow p4, to the position 4a. The chute 2 has, in its upper edge, an opening 8, which is closable by a flap 9 swingable upwardly in the direction shown by the arrow p9, to the upper position shown by the chain lines. The other end of the chute 2 is in a suitable manner (not shown) detachably secured to the table 1.

Another chute 10 having on its outer side a wall 12 extends transversely of the side part of the chute 2 normally under the side wall 4, and leads to a box 11. This second chute 10 is formed as a single unit with the box 11 and side wall 12 and is detachable, and is also in a manner not shown, attachable to another apparatus.

When the side wall 4 is in the position shown by the full lines and the flap 9 is closed, the workpieces which have been discharged from the machine slide down the chute into the box 3. When the wall is swung to the position 4a, the workpieces are guided to the box 11. In a similar manner a third chute 13, to which is connected a box 14 and side wall 15, is connected to the edge of the chute normally under the side wall 5. These parts also conveniently constitute a single unit, which in a manner not shown, is detachably connectible to the other apparatus. When the wall 5 is swung towards the wall 4, and the latter is in the position shown by the continuous lines, the workpieces slide down into the box 14. The boxes are preferably supplied with legs 16 so that they are at the correct height in relation to an operative sitting beside them so that she, without unnecessary movement, can pick up the first workpiece of a connected series of workpieces from the box to perform the next operation. The chutes and boxes may in an easy, simple and cheap manner be made of wood, wood fibre board or similar light material. If it is considered necessary they may also be made of metal so that they can withstand greater wear and tear.

A container 17 has at one end an upwardly extending channel shaped part 18 whose outlet can be connected from below to the opening 8, while the other end of the container 17 has an upwardly directed opening 19. The container 17 has a curved bottom and is so formed that it can be located with the outlet of the part 18, in the manner described above, under the opening 8 in the chute 2 and with the upwardly directed opening 19 beside the operative sitting by the machine. When the side walls 4 and 5 are in the position shown by the continuous lines and when the flap 9 has been moved upwardly in the direction shown by the arrow p9 to the position shown by the chain lines, the workpieces delivered from the machine slide through the opening 8 and channel shaped part 18 to a container 17 fitted in position; the workpiece first released, as a result of the curved bottom of the container and under the influence of the pressure of the succeeding workpieces, takes up a position under the opening 19, through which it can be picked up by the operative performing another operation with the same machine on the same series of workpieces. A third and fourth operation can be performed in this manner in the same machine, the last and first workpiece being connected by threads; the series then passes in a closed circuit through the machine, opening 8, channel shaped part 18, box 17 and opening 19 until either, at the beginning of the last operation, the last workpiece is again separated from the first and the flap 9 is lowered to guide the series to one of the boxes 3, 11 or 14, at the end of the last operation, the last workpiece is separated from the first and the whole series is thereupon collected in the container 17 for possible further transport in it. The container is advantageously fitted with wheels 17a by means of which the workpieces, after the various operations have been performed on them, can be transported in the container without removal, sorting, and tying together to next required position, for example to the first work position in another group of machines or to another position for another treatment. Both the workpieces which have slid down into the container 17 and those which have slid down the channels into the boxes 3, 11 or 14 respectively are so arranged in their respective boxes that the first workpiece of a series is at the front edge of a box, where, as a result of its marking, it is easily recognisable and readily accessible.

Different methods of utilizing the apparatus according to the invention are illustrated diagrammatically in FIGURE 2, which shows a group of sewing machines which are represented by their tables 20, 21, 22, 23, 24, 25, 26 and by the side of which the operatives' seat is represented by a small semi-circle. The imaginary path of the workpieces through this group is given by the chain line arrows. The workpieces represented here are fed to the group in the machine 20 and leave the group from the machines 22, 24, 25 and 26. The machine group shown may be connected to further groups; the operative of the initial machine 20 may be located beside the discharge position of another group and/or the operatives of the initial machines of other groups may be located beside the discharge position of one or more of the final machines 22, 24, 25 or 26.

The delivery arrangements of the initial machine 20, which are exactly the same as those shown in FIGURE 1, comprise three chutes 2, 10 and 13 and a return container 17. From the machine 20 the workpieces there prepared are guided by swinging of the walls 4 and 5 according to the type of work or the subsequent speed of work in the associated machines 21, 23 and 25 to the box 3, 14 or 11. The operative at the machine 20 has a good view of these boxes and can easily and quickly judge how the delivery to the succeeding machines is progressing. If a stoppage should occur the operative of the first machine 20 can raise the flap 9 to feed a series of workpieces to the return container 17, from which she can pick up the first workpiece in the series to perform an extra operation on it and thereby facilitate the work of the operatives of the succeeding machines. In the group shown in FIGURE 2, it is only, in addition to the table 20, the table 25 which has three chutes 2, 10 and 13 attached to it. At the table 21, which is adjacent to the box 3 of the table 20, three successive operations are performed on the workpieces, which between operations is kept in the container 17, and the workpieces are finally delivered to the box 3 of the single chute 2, from which the workpieces pass twice through the machine 22, which also has only a single chute 2. From the latter box 3, the workpieces are picked up either by an operative of another associated group sitting adjacent to it or by a special collector. The machines 23 and 24 differ from the relative arrangement of the machines described above in that the operative of the machine 24 sits beside the return container 17 of the machine 23 and picks the workpieces out of it.

By means of the apparatus shown in FIGURE 1 it is possible to associate with each machine four machines for performing subsequent operations. Each of the latter can serve up to four further machines. Two or more delivery positions from different machines can be arranged for supplying a further machine which assembles the workpieces. It is therefore possible to group as required different machines with any desired diverging or converging work paths for complicated series of operations on large series of workpieces without intervening picking up, sorting, bundling, and transport; and simultaneously it is possible in a flexible manner to select the task of all or some of the machines so as to avoid stoppages and dead time in a very simple manner by teaching the operatives in suitable positions in the production line a simple operation in addition to that which their machines normally perform; and instead of, or in addition to, the latter to utilize a collection box as a buffer from which the workpieces can be removed by relief personnel or an additional operative, or in which the workpieces can be transported to another point in the production line, which means that a "bottle neck" can be temporarily by-passed.

Very great reductions, up to 75%, of the time lost for removal, bundling, and transport of, and writing of work reports, labels or the like for short series of workpieces have been achieved by the apparatus according to the invention.

The invention is not limited to the embodiment shown in the drawings. Different systems for guiding the workpieces from the machine's delivery side to different collecting boxes can be used within the scope of the claims. One of the outer chutes can be replaced by a device which returns the workpieces to the front side of the machine, for example on the opposite side of the return container 17, and the chutes can be arranged in one plane with collection boxes arranged side by side. One of the chutes may have less inclination and a greater length than the others, if a more widely distributed arrangement of the asociated machines is desired. The chutes can if desired be replaced by a transport belt, which may be free running or driven; this further increases the possibility of reaching more points in the associated group of machines directly from the delivery side of the machine. In addition, the number of delivery paths from the delivery side of the machine can be changed from the four possibilities shown in FIGURE 1.

What I claim is:

1. An installation for sorting fibrous workpieces on which several successive operations are to be performed by an operator on a machine having a feed side and a delivery side, said installation comprising several containers for receiving worked-on workpieces disposed on the delivery side of the machine within the reach of an operator operating the machine, several downwardly slanted chutes each placeable to lead from the delivery side of the machine to one of said receiving containers for feeding worked-on workpieces into the respective container by gravity feed, guide members pivotally mounted in said chutes, selectively movable into positions clearing a selected one of said chutes and blocking the others, a collecting receptacle for receiving workpieces disposed on the feed side of the machine within the reach of the operator of the machine, a further downwardly slanted chute leading from the delivery side of the machine to said receptacle, and a guide member in said last-mentioned chute movable between a position clearing said chute and blocking all other chutes and a position blocking said chute and clearing the other chutes for control thereof by the first-mentioned guide members, said chutes leading to said receiving containers being joined at their ends adjacent the delivery side of the machine and having at said end a drop opening located above the chute leading to said collecting receptacle, said last mentioned guide member being hingedly fitted in said opening for selectively moving said guide member respectively into a position closing said opening, thereby clearing said joined ends of the chutes for the passage of workpieces and blocking said chute leading to the receptacle and a position opening said latter chute and blocking said other chutes.

2. An installation according to claim 1 wherein said chutes comprise side walls separating each two adjacent chutes from each other and each mounted pivotally at the end distant from its receiving end, the opposite end of each side wall being swingable respectively into a position clearing a selected one of the respective adjacent chutes and into a position blocking the other one, said pivotal side walls constituting said guide members.

3. An installation according to claim 1 wherein said collecting receptacle and the chute thereof are detachably secured to said other chutes and the delivery side of the machine.

References Cited in the file of this patent
UNITED STATES PATENTS

| | | |
|---|---|---|
| 990,058 | Martell | Apr. 18, 1911 |
| 1,718,948 | Cogswell | July 2, 1929 |
| 2,492,925 | Segur | Dec. 27, 1949 |